United States Patent
Maegawa

(10) Patent No.: US 8,155,917 B2
(45) Date of Patent: Apr. 10, 2012

(54) FLOW DIAGNOSIS APPARATUS FOR FUEL VAPOR PURGE SYSTEM

(75) Inventor: Yoshinori Maegawa, Obu (JP)

(73) Assignee: Denso Corporation, Kariya (JP)

( * ) Notice: Subject to any disclaimer, the term of this patent is extended or adjusted under 35 U.S.C. 154(b) by 426 days.

(21) Appl. No.: 12/428,595

(22) Filed: Apr. 23, 2009

(65) Prior Publication Data

US 2009/0266147 A1    Oct. 29, 2009

(30) Foreign Application Priority Data

Apr. 24, 2008  (JP) .................................. 2008-113365

(51) Int. Cl.
*G01M 3/02* (2006.01)
(52) U.S. Cl. ........................................ 702/140; 73/49.7
(58) Field of Classification Search ............. 73/40–49.8, 73/865.8; 702/50, 51, 138, 140, 189
See application file for complete search history.

(56) References Cited

U.S. PATENT DOCUMENTS

| | | | | |
|---|---|---|---|---|
| 5,205,263 A * | 4/1993 | Blumenstock et al. | ....... | 123/520 |
| 5,230,319 A * | 7/1993 | Otsuka et al. | .................. | 123/520 |
| 5,295,472 A * | 3/1994 | Otsuka et al. | .................. | 123/520 |
| 5,400,759 A * | 3/1995 | Ishida | ............................ | 123/520 |
| 5,443,051 A * | 8/1995 | Otsuka | ........................... | 123/520 |
| 5,494,021 A * | 2/1996 | Yoneyama | .................... | 123/520 |
| 5,901,733 A * | 5/1999 | Ohno et al. | .................... | 137/202 |
| 6,240,908 B1 * | 6/2001 | Hyodo et al. | ................. | 123/516 |
| 6,244,310 B1 * | 6/2001 | Rowland et al. | ................ | 141/59 |
| 6,363,921 B1 * | 4/2002 | Cook et al. | ..................... | 123/520 |
| 6,536,261 B1 * | 3/2003 | Weldon et al. | ................ | 73/49.7 |
| 6,658,925 B2 * | 12/2003 | Cook et al. | ................ | 73/114.39 |
| 2004/0200460 A1 * | 10/2004 | Mitani et al. | .................. | 123/520 |
| 2005/0107964 A1 * | 5/2005 | Wakairo | .......................... | 702/51 |
| 2005/0204924 A1 * | 9/2005 | Nakamura et al. | .............. | 96/147 |
| 2006/0144370 A1 * | 7/2006 | Iihoshi et al. | .................. | 123/491 |

FOREIGN PATENT DOCUMENTS

JP    2004-300997    10/2004

* cited by examiner

*Primary Examiner* — David Rogers
(74) *Attorney, Agent, or Firm* — Nixon & Vanderhye P.C.

(57) ABSTRACT

A pressure sensor senses a pressure of a fuel vapor system at a fuel vapor passage. An electronic control unit executes a post-depressurization period flow diagnosis to determine whether the fuel vapor passage is clogged based on a behavior of the pressure in the fuel vapor system, which is sensed with the pressure sensor in a sealed state of the fuel vapor system after introduction of a negative pressure into the fuel vapor system.

6 Claims, 13 Drawing Sheets

FLOW DIAGNOSIS APPARATUS FOR FUEL VAPOR PURGE SYSTEM

CROSS REFERENCE TO RELATED APPLICATION

This application is based on and incorporates herein by reference Japanese Patent Application No. 2008-113365 filed on Apr. 24, 2008.

BACKGROUND OF THE INVENTION

1. Field of the Invention

The present invention relates to a flow diagnosis apparatus for a fuel vapor purge system.

2. Description of Related Art

In a previously proposed fuel vapor purge system, fuel vapor, which is generated in a fuel tank of a vehicle, is adsorbed to an adsorbent material received in a canister to limit leakage of the fuel vapor from the fuel tank to the surrounding atmosphere. Then, the fuel vapor, which is adsorbed to the adsorbent material in the canister, is desorbed from the adsorbent material and is purged into an air intake system of an internal combustion engine, which supplies fresh air to combustion chambers of the internal combustion engine. The purging of the fuel vapor is accomplished by action of a negative pressure in the air intake system upon opening of a purge control valve provided in a purge passage, which communicates between the canister and the air intake system and forms a fuel vapor system in cooperation with the fuel tank and the canister. Here, it is necessary to sense a leakage of the fuel vapor from the fuel vapor purge system to the atmosphere in an early stage to limit a prolonged leakage of the fuel vapor from the fuel vapor purge system to the atmosphere.

Japanese Unexamined Patent Publication No. 2004-300997A discloses a technique for addressing the above need. According to this technique, a leak check module is connected to a canister of a fuel vapor purge system. The leak check module has a pressure sensor, a vacuum pump, a reference pressure sensing arrangement and a passage change valve. First of all, the vacuum pump is driven to introduce the negative pressure into the reference pressure sensing arrangement. Then, the reference pressure is sensed with the pressure sensor. Thereafter, the negative pressure introducing passage of the vacuum pump is changed by driving the passage change valve to introduce the negative pressure into the fuel vapor system, which includes the fuel tank. Then, the pressure in the fuel vapor system is sensed with the pressure sensor. The pressure in the fuel vapor system is compared with the reference pressure to determine whether a leak exists in the fuel vapor system with the high accuracy.

In the fuel vapor purge system, the fuel vapor passage conducts fuel vapor from the fuel tank and purges the fuel vapor into the air intake system of the internal combustion engine. When the fuel vapor passage is clogged with a foreign object (e.g., debris, dusts or the like), the fuel vapor in the fuel tank cannot be purged into the air intake system. The inventor of the present invention has conducted various experiments about a flow diagnosis that determines whether the fuel vapor passage is clogged based on behavior (e.g., a decreasing speed) of the pressure in the fuel vapor system, which is sensed with the pressure sensor at the time of introducing the negative pressure from the air intake system, into the fuel vapor system by opening the purge control valve while the engine is running. The inventor of the present invention has encountered the following problems through the experiments.

In the case of Japanese Unexamined Patent Publication No. 2004-300997A where the leak check module is connected to the canister of the fuel vapor purge system, the pressure sensor is connected to the canister provided in the fuel vapor passage, which extends from the fuel tank to the air intake system of the engine. In this structure, in a case (see FIG. 4) where the clogging occurs in a portion of the fuel vapor passage located on the air intake system side of the pressure sensor (canister), the pressure does not decrease substantially or decreases at the reduced speed at the location of the pressure sensor. In view of this, it is possible to sense the clogging of the fuel vapor passage by monitoring the behavior of the sensed pressure, which is sensed with the pressure sensor during the period of introducing the negative pressure into the fuel vapor system.

However, the pressure at the sensing location of the pressure sensor decreases rapidly at the time of introducing the negative pressure from the air intake system into the fuel vapor passage in a case (see FIGS. 7A and 7B) where the clogging occurs in another portion of the fuel vapor passage located on the fuel tank side of the pressure sensor (canister) as well as in a case (see FIGS. 6A and 6B) where a fuel vapor inlet of the fuel vapor passage is closed by a shutoff valve in the full level of the fuel tank. Therefore, the difference in the behavior (e.g., the decreasing speed) of the sensed pressure, which is sensed with the pressure sensor during the period of introducing the negative pressure into the fuel vapor system, becomes small between these two cases. Therefore, even when the behavior of the pressure, which is sensed with the pressure sensor during the period of introducing the negative pressure into the fuel vapor system, is monitored, it is difficult to distinguish between the case where the clogging occurs in the other portion of the fuel vapor passage located on the fuel tank side of the pressure sensor and the case where the fuel level in the fuel tank is the full level. Thus, it is difficult to accurately determine whether the other portion of the fuel vapor passage located on the fuel tank side of the pressure sensor is clogged with the high accuracy.

SUMMARY OF THE INVENTION

The present invention addresses the above disadvantages. According to the present invention, there is provided a flow diagnosis apparatus for a fuel vapor purge system, which includes a fuel vapor system that has a fuel tank and a fuel vapor passage and purges fuel vapor generated in the fuel tank into an air intake system of an internal combustion engine through the fuel vapor passage. The flow diagnosis apparatus includes a pressure sensing means and a flow diagnosis means. The pressure sensing means is for sensing a pressure of the fuel vapor system at the fuel vapor passage. The flow diagnosis means is for executing a post-depressurization period flow diagnosis to determine whether the fuel vapor passage is clogged based on a behavior of the pressure in the fuel vapor system, which is sensed with the pressure sensing means in a sealed state of the fuel vapor system after introduction of a negative pressure into the fuel vapor system.

BRIEF DESCRIPTION OF THE DRAWINGS

The invention, together with additional objectives, features and advantages thereof, will be best understood from the following description, the appended claims and the accompanying drawings in which:

DETAILED DESCRIPTION OF THE INVENTION

Various embodiments of the present invention will be described with reference to the accompanying drawings.
First Embodiment
A first embodiment of the present invention will be described with reference to FIGS. 1 to 10.

First, a structure of a fuel vapor purge system (an evaporative emission purge system) of the present embodiment will be schematically described with reference to FIG. 1.

A canister 13 is connected to a fuel tank 11 through a fuel vapor leading passage (a part of a fuel vapor passage) 12. An adsorbent material (not shown), such as an activated carbon material, is received in the canister 13 to adsorb the fuel vapor (fuel evaporative emissions).

A fuel vapor purge passage (another part of the fuel vapor passage) 14 is provided between the canister 13 and an air intake system of an internal combustion engine to purge the fuel vapor, which has been adsorbed on the adsorbent material in the canister 13, into the air intake system. A purge control valve 15 is installed in the purge passage 14 to control the purge flow quantity of the fuel vapor in the purge passage 14. The purge control valve 15 is a normally closed solenoid valve and controls the purge flow quantity of the fuel vapor, which is purged from the canister 13 into the air intake system, through the duty control of the electric power supplied thereto.

Figure 2:
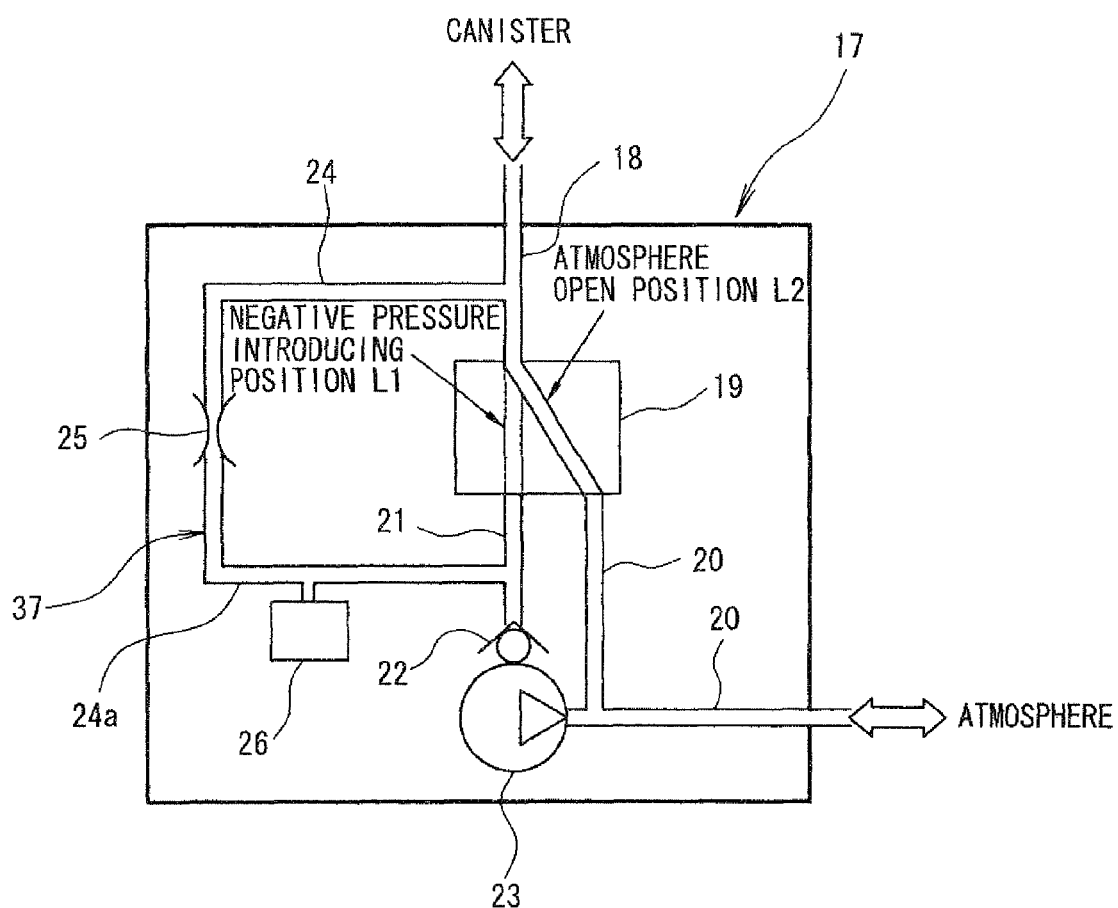
FIG. 2 is a schematic view showing a leak check module of the fuel vapor purge system according to the first embodiment.

A leak check module 17 (a pressure introduction sensing device) is connected to the canister 13 to execute a leak diagnosis operation of a fuel vapor system, which extends from the fuel tank 11 to the purge control valve 15. Here, it should be noted that the fuel vapor system is a part of the fuel vapor purge system and includes the fuel tank 11, the fuel vapor leading passage 12, the canister 13, the fuel vapor purge passage 14, the purge control valve 15, the leak check module 17 and a canister communication passage 18 (described below). The fuel vapor purge system purges the fuel vapor generated in the fuel tank 11 of the fuel vapor system into the air intake system. As shown in FIG. 2, in the leak check module 17, an atmosphere communication passage 20 and a negative pressure introducing passage 21 are connected to a canister communication passage 18, which extends from the canister 13, through a passage change valve (a passage switch valve) 19. The atmosphere communication passage 20 is directly communicated with the atmosphere. The negative pressure introducing passage 21 is connected to the atmosphere communication passage 20 through a check valve 22 and an electric vacuum pump 23. During the operation of the vacuum pump 23, the check valve 22 is opened to discharge the gas from the negative pressure introducing passage 21 into the atmosphere communication passage 20. In contrast, when the vacuum pump 23 is not operated, i.e., is stopped, the check valve 22 is closed to limit the backflow of the atmospheric gas from the atmosphere communication passage 20 into the negative pressure introducing passage 21.

The passage change valve 19 is a solenoid valve, which is operable between a negative pressure introducing position L1 and an atmosphere open position L2. At the atmosphere open position L2, the passage change valve 19 communicates between the canister communication passage 18 and the atmosphere communication passage 20. At the negative pressure introducing position L1, the passage change valve 19 communicates between the canister communication passage 18 and the negative pressure introducing passage 21.

A bypass passage 24, which bypasses the passage change valve 19, is connected between the canister communication passage 18 and the negative pressure introducing passage 21. Furthermore, a reference orifice (a choked reference hole) 25 is provided in the bypass passage 24. A passage cross-sectional area of the reference orifice 25 is substantially reduced in comparison to a passage cross-sectional area of any other section of the bypass passage 24 and thereby has a reference leak hole diameter (e.g., a diameter of 0.5 mm). A passage 24a communicates between the reference orifice 25 and the negative pressure introducing passage 21. The reference orifice 25 and the negative pressure introducing passage 21 form a reference pressure sensing arrangement 37. A pressure sensor (a pressure sensing means) 26 is provided in the reference pressure sensing arrangement 37.

When the passage change valve 19 is placed in the negative pressure introducing position L1 in the valve closed state of the purge control valve 15, the fuel vapor system is sealed, so that an area around the pressure sensor 26 in the reference pressure sensing arrangement 37 is communicated with the interior of the fuel vapor system through the negative pressure introducing passage 21 and the canister communication passage 18. Thereby, it is possible to sense the pressure in the fuel vapor system by sensing the pressure in the reference pressure sensing arrangement 37 with the pressure sensor 26.

Then, when the vacuum pump 23 is operated in the sealed state of the fuel vapor system upon placement of the passage change valve 19 in the negative pressure introducing position L1, the gas in the fuel vapor system is discharged to the atmosphere through the canister 13. Thereby, the negative pressure is introduced into the fuel vapor system. In other words, the interior of the fuel vapor system is depressurized.

In contrast, when the passage change valve 19 is placed in the atmosphere open position L2 in the valve closed state of the purge control valve 15, the interior of the bypass passage 24 (thereby the interior of the reference pressure sensing arrangement 37) opens to the atmosphere through the atmosphere communication passage 20. Thereby, it is possible to sense the pressure of the atmosphere (i.e., the atmospheric pressure) by sensing the pressure in the reference pressure sensing arrangement 37 with the pressure sensor 26.

In this state where the passage change valve 19 is placed in the atmosphere open position L2 to open the interior of the fuel vapor system to the atmosphere, when the vacuum pump 23 is operated, the negative pressure prevails in the interior of the reference pressure sensing arrangement 37 due to the presence of the reference orifice 25. At this time, it is possible to sense the reference pressure, which corresponds to the reference leak hole diameter of the reference orifice 25, by sensing the pressure in the interior of the reference pressure sensing arrangement 37 with the pressure sensor 26.

As discussed above, the passage change valve 19 is operable to change between the passage (the passage at the atmosphere open position L2), which introduces the negative pressure (the predetermined pressure) from the vacuum pump 23 into the reference pressure sensing arrangement 37 upon operation of the vacuum pump 23, and the passage (the passage at the negative pressure introducing position L1), which introduces the negative pressure (the predetermined pressure) from the vacuum pump 23 into the fuel vapor system upon operation of the vacuum pump 23.

Figure 1:
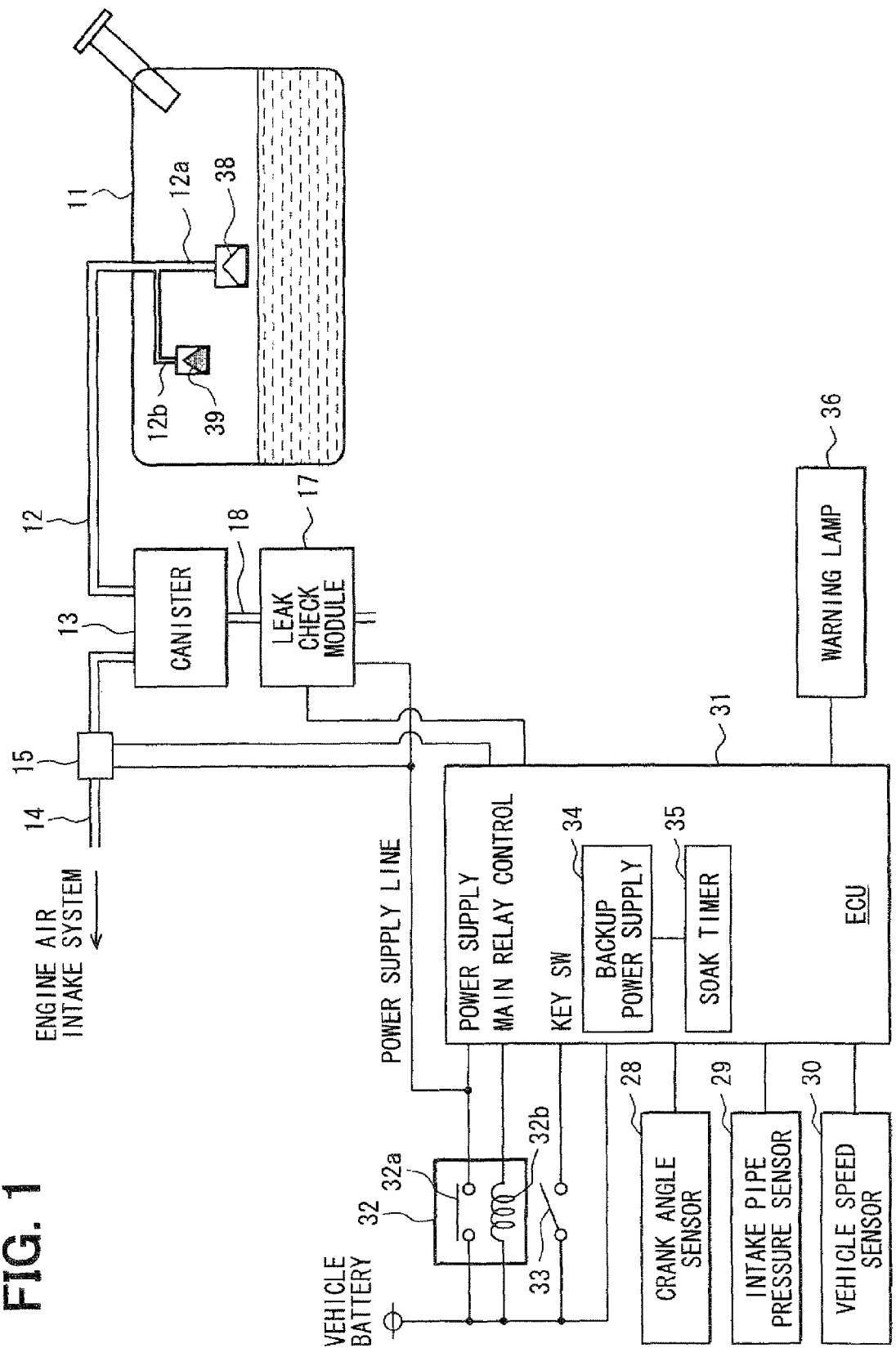
FIG. 1 is a schematic diagram showing a fuel vapor purge system according to a first embodiment of the present invention.

As shown in FIG. 1, the fuel vapor leading passage 12 is branched into a first passage 12a and a second passage 12b in the interior of the fuel tank 11. A shutoff valve 38 is provided in the first passage 12a to close a fuel vapor inlet of the first passage 12a when a fuel level in the fuel tank 11 is increased to a full level. Furthermore, a rollover valve 39 is provided in the second passage 12b to close a fuel vapor inlet of the second passage 12b when the vehicle is tilted or is rolled over.

Outputs of various sensors, which include the pressure sensor 26 of the leak check module 17, a crank angle sensor 28, an intake pipe pressure sensor 29 and a vehicle speed sensor 30, are supplied to a control circuit referred to as an electronic control unit (ECU) 31 in the fuel vapor purge system. The crank angle sensor 28 outputs a crank angle signal at every predetermined crank angle. The intake pipe pressure sensor 29 senses the pressure in the air intake pipe of the air intake system. The vehicle speed sensor 30 senses the vehicle speed. A power supply voltage is supplied to power source terminals of the ECU 31 from a vehicle battery (not shown) through a main relay 32.

The power supply voltage is also supplied to the other corresponding devices, such as the purge control valve 15, the passage change valve 19, the vacuum pump 23 and the pressure sensor 26. A relay drive coil 32b, which drives a relay contact 32a of the main relay 32, is connected to a main relay control terminal of the ECU 31. When the power supply to the relay drive coil 32b is turned on, the relay contact 32a is turned on (placed in an ON state) to supply the power supply voltage to the ECU 31 and the other corresponding devices. When the power supply to the relay drive coil 32b is turned off (placed in an OFF state), the relay contact 32a is turned off (placed in an OFF state) to turn off the power supply to the ECU 31 and the other corresponding devices.

A key switch terminal (often also referred to as a key SW terminal) of the ECU 31 receives an ON/OFF signal of an ignition switch (hereinafter, also referred to as an IG switch) 33. When the IG switch 33 is turned on, the main relay 32 is turned on to start the power supply to the ECU 31 and the other corresponding devices. In contrast, when the IG switch 33 is turned off, the main relay 32 is turned off to turn off the power supply to the ECU 31.

The ECU 31 further includes a backup power supply 34 and a soak timer 35. The soak timer 35 is powered from the backup power supply 34 and measures the elapsed time. The soak timer 35 starts the measurement of the elapsed time upon the turning off, i.e., stopping of the engine (the turning off of the IG switch 33) to measure the elapsed time since the time of turning off of the engine. As discussed above, when the IG switch 33 is turned off, the main relay 32 is turned off to turn off the power supply to the ECU 31 and the other corresponding devices. However, when the measured elapsed time of the soak timer 35 (the elapsed time upon the turning off of the engine) reaches predetermined time (e.g., three to five hours), the main relay 32 is turned on by driving the drive circuit of the main relay control terminal of the ECU 31 to perform the leak diagnosis in the non-operating state of the engine while the backup power supply 34 of the ECU 31 is used as the power supply (power source) for this purpose. Thereby, the power supply voltage is supplied to the ECU 31, the purge control valve 15, the passage change valve 19, the vacuum pump 23 and the pressure sensor 26.

The ECU 31 includes a microcomputer as its main component. When a fuel injection control program, an ignition control program and a purge control program, which are stored in a ROM (a storage medium) of the ECU 31, are executed, a fuel injection control operation, an ignition control operation and a purge control operation are respectively executed.

Furthermore, when the ECU 31 executes a leak diagnosis routine (not shown), the ECU 31 serves as a leak diagnosis means for diagnosing whether a leak exists in the fuel vapor system through comparison of the reference pressure and the measured pressure (sensed pressure) of the interior of the fuel vapor system by controlling the leak check module 17 in the stop state of the engine.

The leak diagnosis operation of the fuel vapor system, which is executed by the ECU 31, will now be described. The reference pressure sensing process starts when the predetermined time (e.g., 3 to 5 hours) elapses from the time of the engine stop (the time of turning off of the IG switch 33). In this reference pressure sensing process, the vacuum pump 23 is turned on to introduce the negative pressure into the reference pressure sensing arrangement 37, i.e., to depressurize the interior of the reference pressure sensing arrangement 37 while maintaining the valve closed state of the purge control valve 15 and maintaining the atmosphere open position L2 of the passage change valve 19. Then, when the predetermined time T0 elapses from the time of starting the introduction of the negative pressure into the reference pressure sensing arrangement 37, it is determined that the negative pressure in the reference pressure sensing arrangement 37 is stabilized at or around the reference pressure, which corresponds to the size of the reference orifice 25, and the pressure in the reference pressure sensing arrangement 37 sensed with the pressure sensor 26 is stored as the reference pressure P0 in the memory of the ECU 31.

After the measurement of the reference pressure P0, a fuel vapor system internal pressure sensing process is started. In the fuel vapor system internal pressure sensing process, the passage change valve 19 is changed to establish the communication of the negative pressure introducing position L1 to introduce the negative pressure from the vacuum pump 23 into the fuel vapor system while the vacuum pump 23 is maintained in the ON-state. When the predetermined time Tevp elapses from the time of starting the introduction of the negative pressure into the fuel vapor system, the pressure Pevp in the fuel vapor system (hereinafter, also referred to as the fuel vapor system internal pressure Pevp) is sensed with the pressure sensor 26 and is stored in the memory of the ECU 31.

Thereafter, the fuel vapor system internal pressure Pevp is compared with a leak determination value (e.g., that value, which is equal to the reference pressure P0 or is slightly lower than the reference pressure P0). When it is determined that the fuel vapor system internal pressure Pevp is equal to or smaller than the leak determination value, it is determined that the leak does not exist in the fuel vapor system. In contrast, when it is determined that the fuel vapor system internal pressure Pevp is higher than the leak determination threshold value, it is determined that the leak exists in the fuel vapor system. At that time, when the fuel vapor system internal pressure Pevp is close to the reference pressure P0, it is determined that the size of the leak hole substantially corresponds to the reference leak hole diameter (e.g., the diameter of 0.5 mm) of the reference orifice 25. In contrast, when the fuel vapor system internal pressure Pevp is substantially higher than the reference pressure P0, it is determined that the size of the leak hole is substantially larger than the reference leak hole diameter of the reference orifice 25.

In the fuel vapor purge system, when the fuel vapor passage (including the fuel vapor leading passage 12 and the fuel vapor purge passage 14), which is used to purge the fuel vapor in the fuel tank 11 into the air intake system, is clogged with the foreign object(s) or is clogged due to the collapse of the fuel vapor passage, the fuel vapor in the fuel tank 11 cannot be purged into the air intake system.

Accordingly, the ECU 31 carries out a depressurization period flow diagnosis routine of FIG. 8 to determine whether the purge passage 14, which is the portion of the fuel vapor passage located on the air intake system side of the pressure sensor 26 (the canister 13), is clogged based on the behavior of the internal pressure of the fuel vapor system (hereinafter, also referred to as "sensed pressure behavior during the negative pressure introduction, i.e., the depressurization") that is sensed with the pressure sensor 26 at the time of introducing the negative pressure from the air intake system into the fuel vapor system, i.e., at the time of depressurizing the fuel vapor system upon opening of the purge control valve 15 during the running state of the engine.

Figure 3:
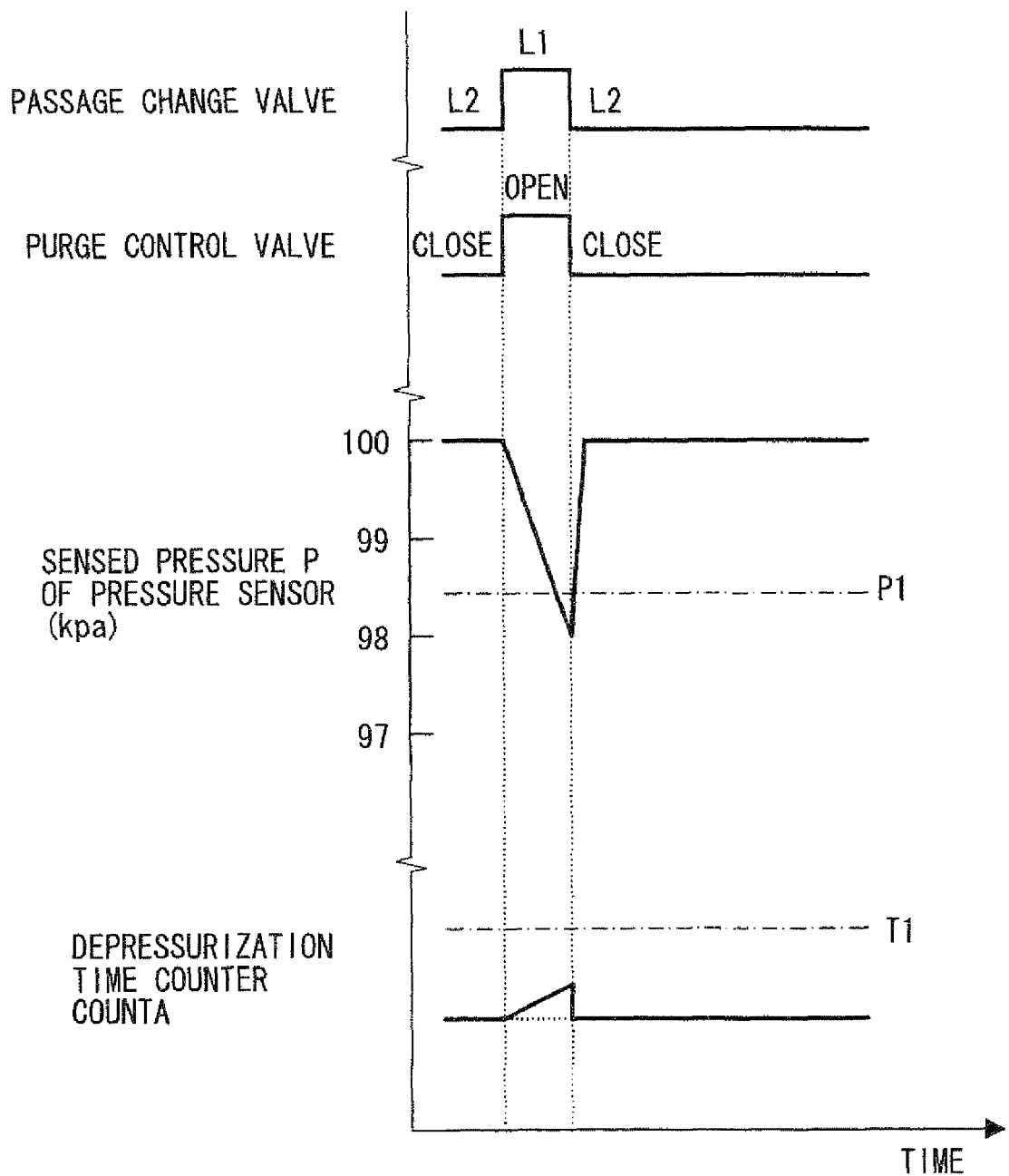
FIG. 3 is a diagram showing a time chart indicating a behavior of a sensed pressure in a case where a portion of a fuel vapor passage, which is located on an air intake system side of a pressure sensor, is normal.
Figure 4:
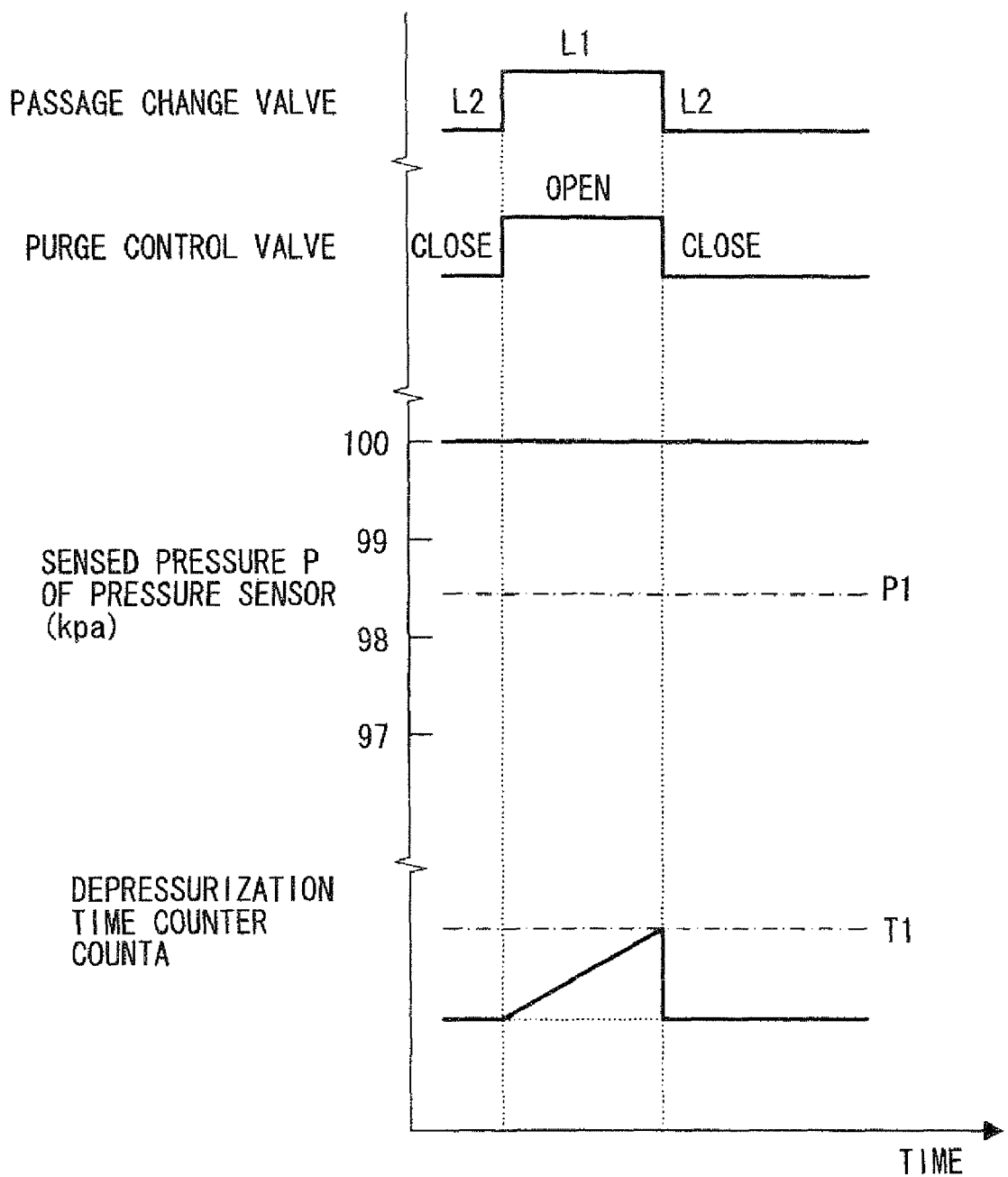
FIG. 4 is a diagram showing a time chart indicating a behavior of the sensed pressure in a case where the portion of the fuel vapor passage, which is located on the air intake system side of the pressure sensor, is clogged.
Figure 5A:
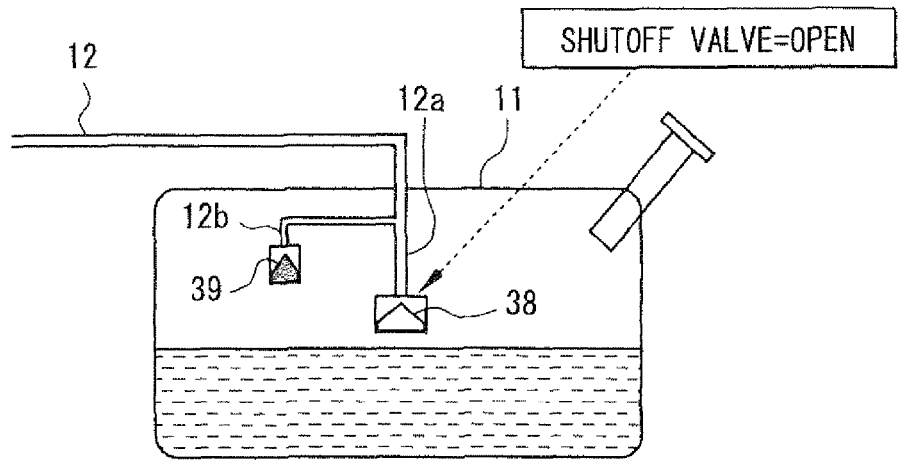
FIG. 5A is a schematic diagram showing a case where a fuel level in a fuel tank is below a full level, and thereby a shutoff valve is opened.
Figure 5B:
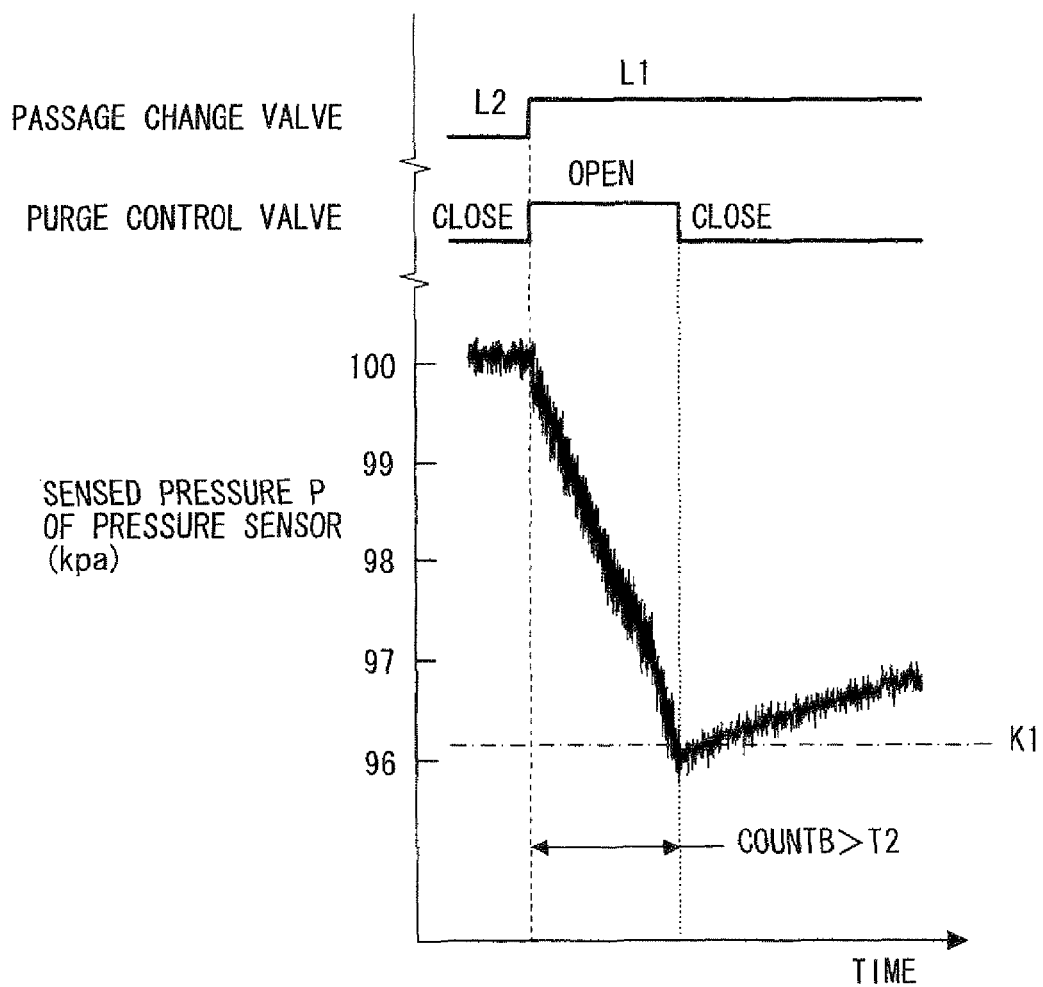
FIG. 5B is a diagram showing a time chart indicating a behavior of the sensed pressure in a case where the other portion of the fuel vapor passage, which is located on a fuel tank side of the pressure sensor, is normal at the time when the fuel level in the fuel tank is not in the full level as indicated in FIG. 5A.

As shown in FIG. 3, in the case where the purge passage 14 (the portion of the fuel vapor passage on the air intake system side of the pressure sensor 26) is normal, the pressure at the sensing location of the pressure sensor 26 is reduced at the time of introducing the negative pressure from the air intake system into the fuel vapor system. In contrast, as shown in FIG. 4, in the case where the purge passage 14 is clogged, the pressure at the sensing location of the pressure sensor 26 is not substantially reduced or is reduced at a slower speed at the time of introducing the negative pressure from the air intake system into the fuel vapor system. Therefore, when the depressurization period flow diagnosis is executed to monitor the behavior of the sensed pressure at the time of introducing the negative pressure, it is possible to sense the clogging of the purge passage 14.

Figure 6A:
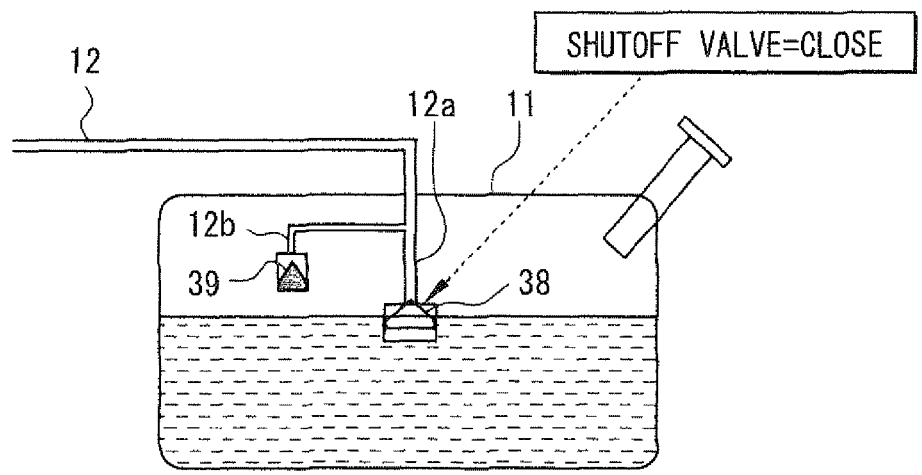
FIG. 6A is a schematic diagram showing a case where the fuel level in the fuel tank is the full level, and thereby the shutoff valve is closed.
Figure 7A:
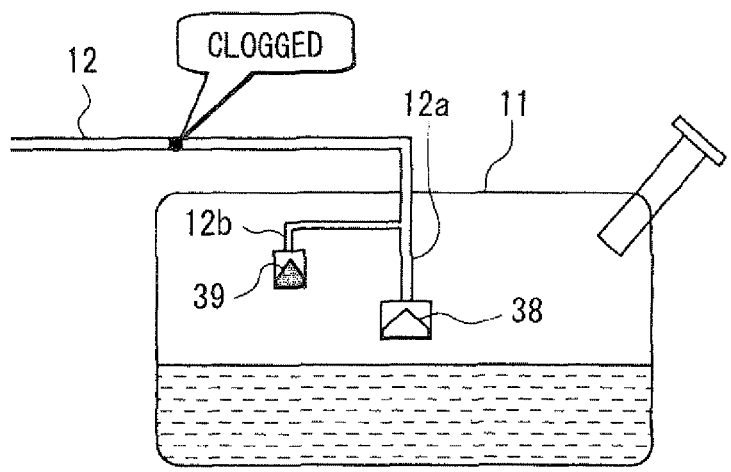
FIG. 7A is a schematic diagram showing a case where the other portion of the fuel vapor passage, which is located on the fuel tank side of the pressure sensor, is clogged.

However, in the case where the fuel vapor leading passage 12, which is the other portion of the fuel vapor passage located on the fuel tank 11 side of the pressure sensor 26 (the canister 13), is clogged as shown in FIG. 7A and also in the case where the fuel vapor inlet of the first passage 12a of the fuel vapor leading passage 12 is closed by the shutoff valve 38 in the full level of the fuel in the fuel tank 11 as shown in FIG. 6A, the pressure at the sensing location of the pressure sensor 26 decreases at the relatively fast speed during the period of the negative pressure introduction from the air intake system into the fuel vapor system. Therefore, the difference in the behavior of the sensed pressure (e.g., the reducing speed of the sensed pressure) during the period of the negative pressure introduction becomes smaller between these cases. Therefore, even when the behavior of the sensed pressure is monitored during the period of the negative pressure introduction, it is difficult to distinguish between the case where the fuel vapor leading passage 12 (the other portion of the fuel vapor passage located on the fuel tank 11 side of the pressure sensor 26) is clogged and the case where fuel level in the fuel tank 11 is the full level. Thus, it is difficult to accurately determine whether the clogging exists in the fuel vapor leading passage 12.

Figure 9:
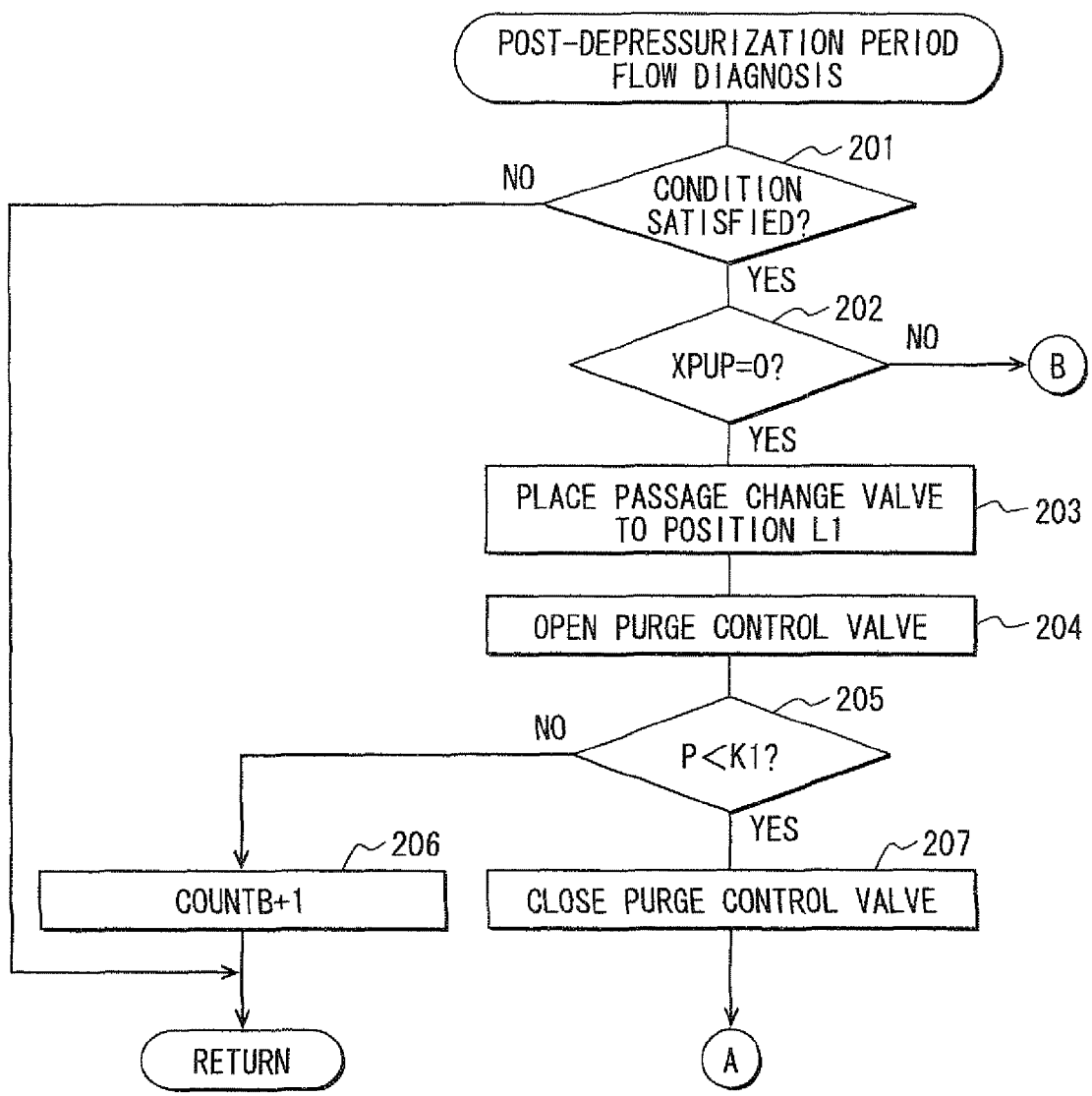
FIG. 9 is a flowchart showing a first part of a post-depressurization period flow diagnosis according to the first embodiment.
Figure 10:
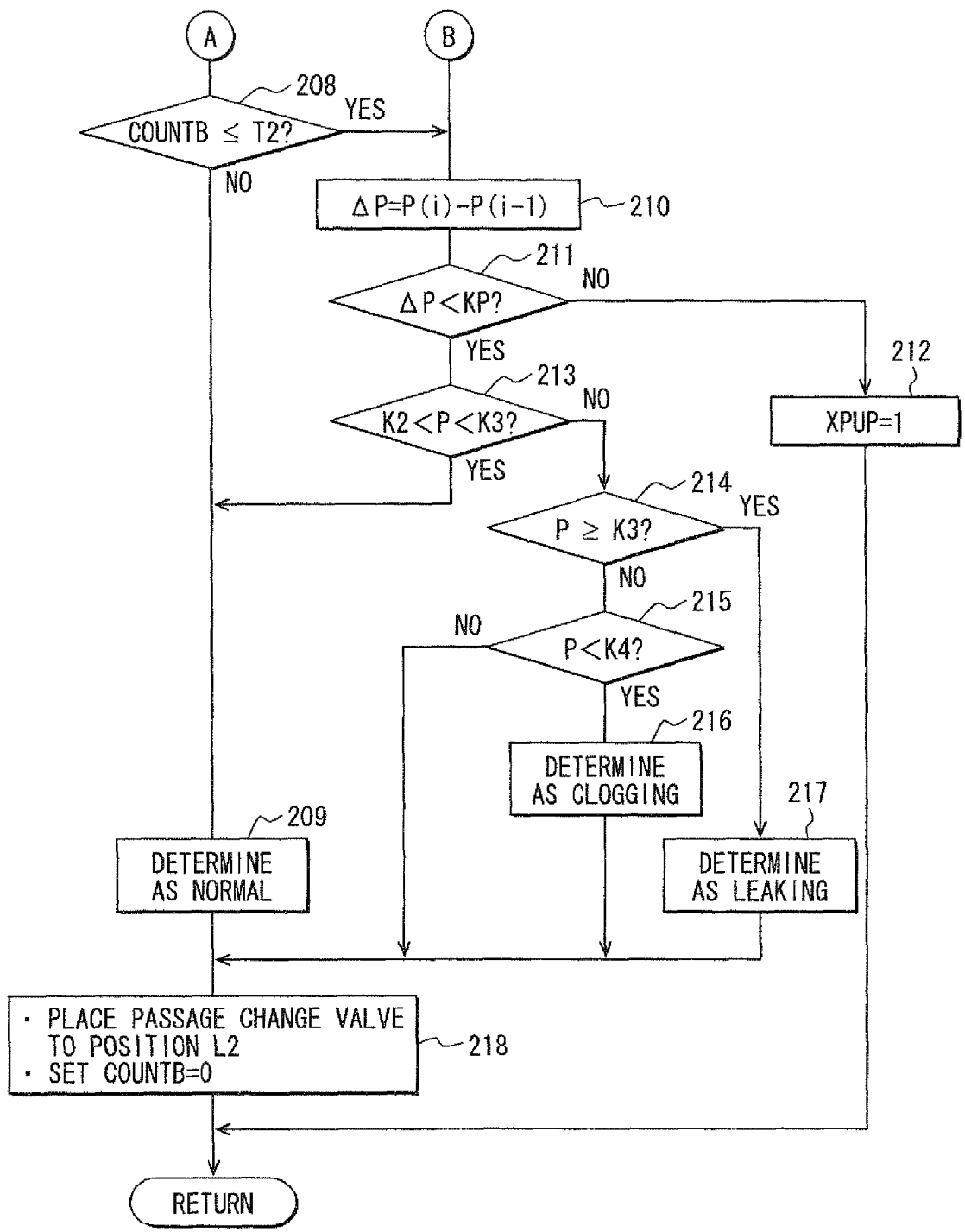
FIG. 10 is a flowchart showing a second part of the post-depressurization period flow diagnosis according to the first embodiment.

In view of the above point, the ECU 31 executes a post-depressurization period flow diagnosis routine (a flow diagnosis routine executed after the introduction of the negative pressure into the fuel vapor system, i.e., after the depressurization of the fuel vapor system) of FIGS. 9 and 10 to determine whether the fuel vapor leading passage 12, which is the other portion of the fuel vapor passage located on the fuel tank 11 side of the pressure sensor 26 (the canister 13), is clogged based on the behavior of the sensed pressure of the fuel vapor system (the sensed pressure behavior after the negative pressure introduction into the fuel vapor system), which is sensed with the pressure sensor 26 in the sealed state of the fuel vapor system after the introduction of the negative pressure from the air intake system into the fuel vapor system through opening of the purge control valve 15 and then closing the purge control valve 15 during the running state of the engine.

Figure 6B:
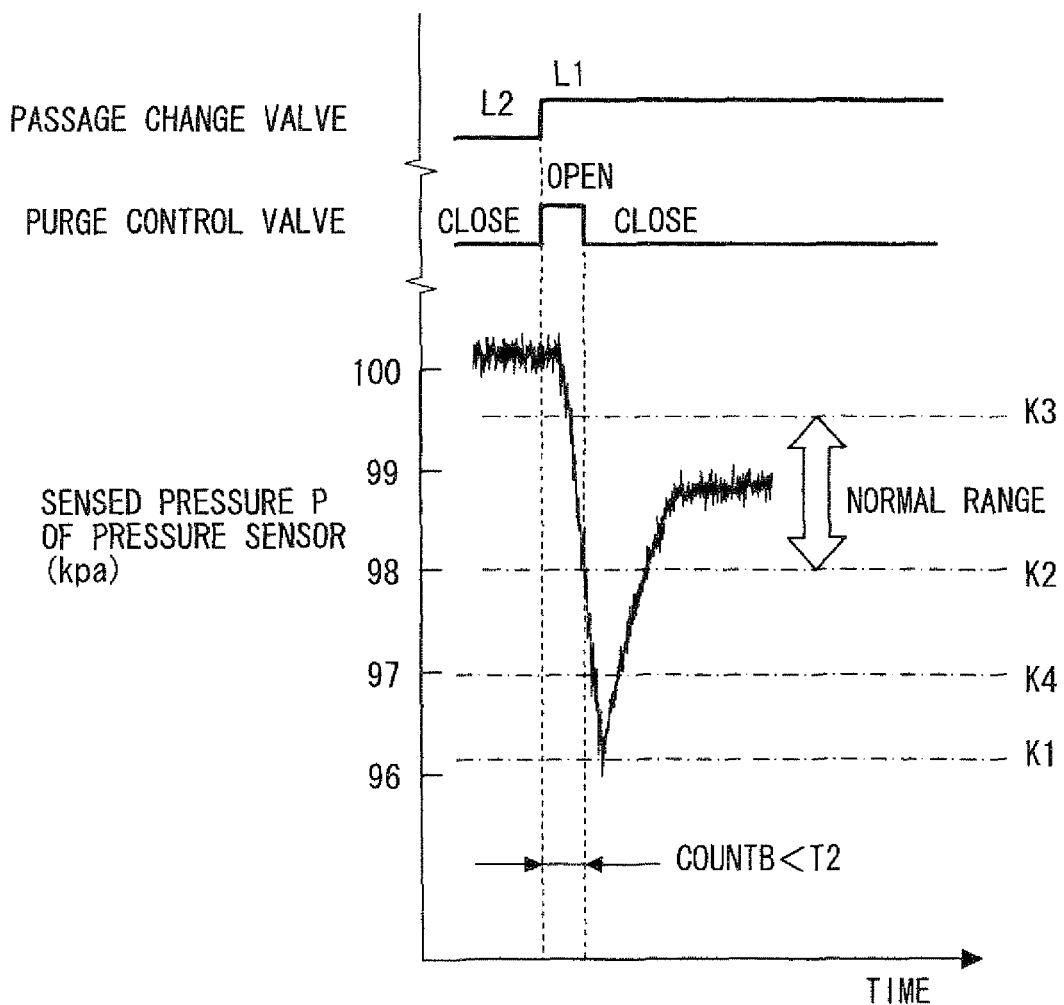
FIG. 6B is a diagram showing a time chart indicating a behavior of the sensed pressure in a case where the other portion of the fuel vapor passage, which is located on the fuel tank side of the pressure sensor, is normal at the time when the fuel level in the fuel tank is the full level as indicated in FIG. 6A.
Figure 7B:
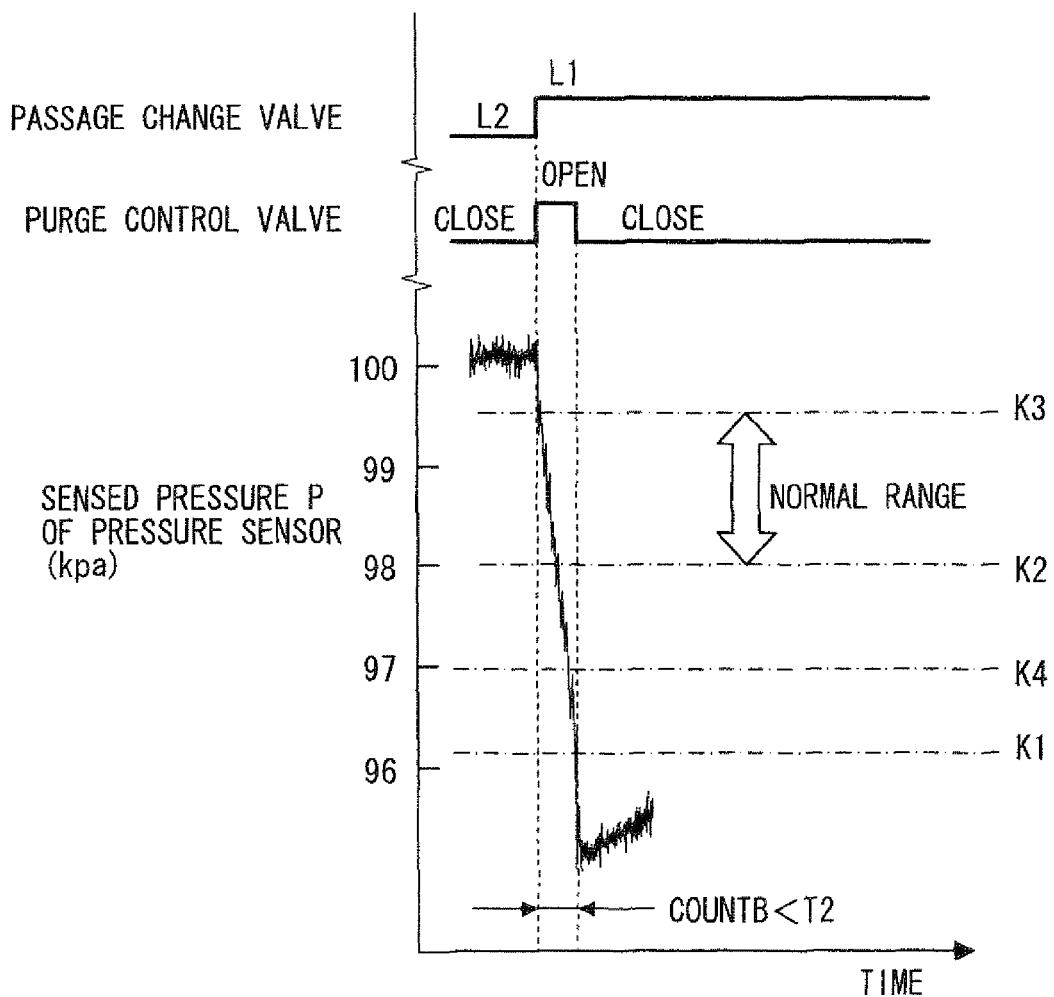
FIG. 7B is a diagram showing a time chart indicating a behavior of the sensed pressure in the case where the other portion of the fuel vapor passage, which is located on the fuel tank side of the pressure sensor, is clogged as indicated in FIG. 7A.

As shown in FIGS. 6A and 6B, in the case where the fuel level in the fuel tank 11 is the full level, when the fuel vapor system is maintained in the sealed state after the introduction of the negative pressure in the fuel vapor system, the pressure at the sensing location of the pressure sensor 26 is stabilized after showing a certain increase of the pressure. However, as shown in FIGS. 7A and 7B, in the case where the fuel vapor leading passage 12 (the other portion of the fuel vapor passage located on the fuel tank 11 side of the pressure sensor 26) is clogged, when the fuel vapor system is sealed after the introduction of the negative pressure in the fuel vapor system, the pressure at the sensing location of the pressure sensor 26 does not show a substantial increase and is generally stabilized.

When the post-depressurization period flow diagnosis is executed in view of the above pressure behavior difference to monitor the sensed pressure behavior after the negative pressure introduction (the behavior of the internal pressure of the fuel vapor system, which is sensed with the pressure sensor 26 in the sealed state of the fuel vapor system after the introduction of the negative pressure into the fuel vapor system), it is possible to more accurately determine whether the fuel vapor leading passage 12 is clogged by more accurately distinguishing between the case where the fuel vapor leading passage 12 (the other portion of the fuel vapor passage located on the fuel tank 11 side of the pressure sensor 26) is clogged and the case where the fuel level in the fuel tank 11 is the full level.

Figure 8:
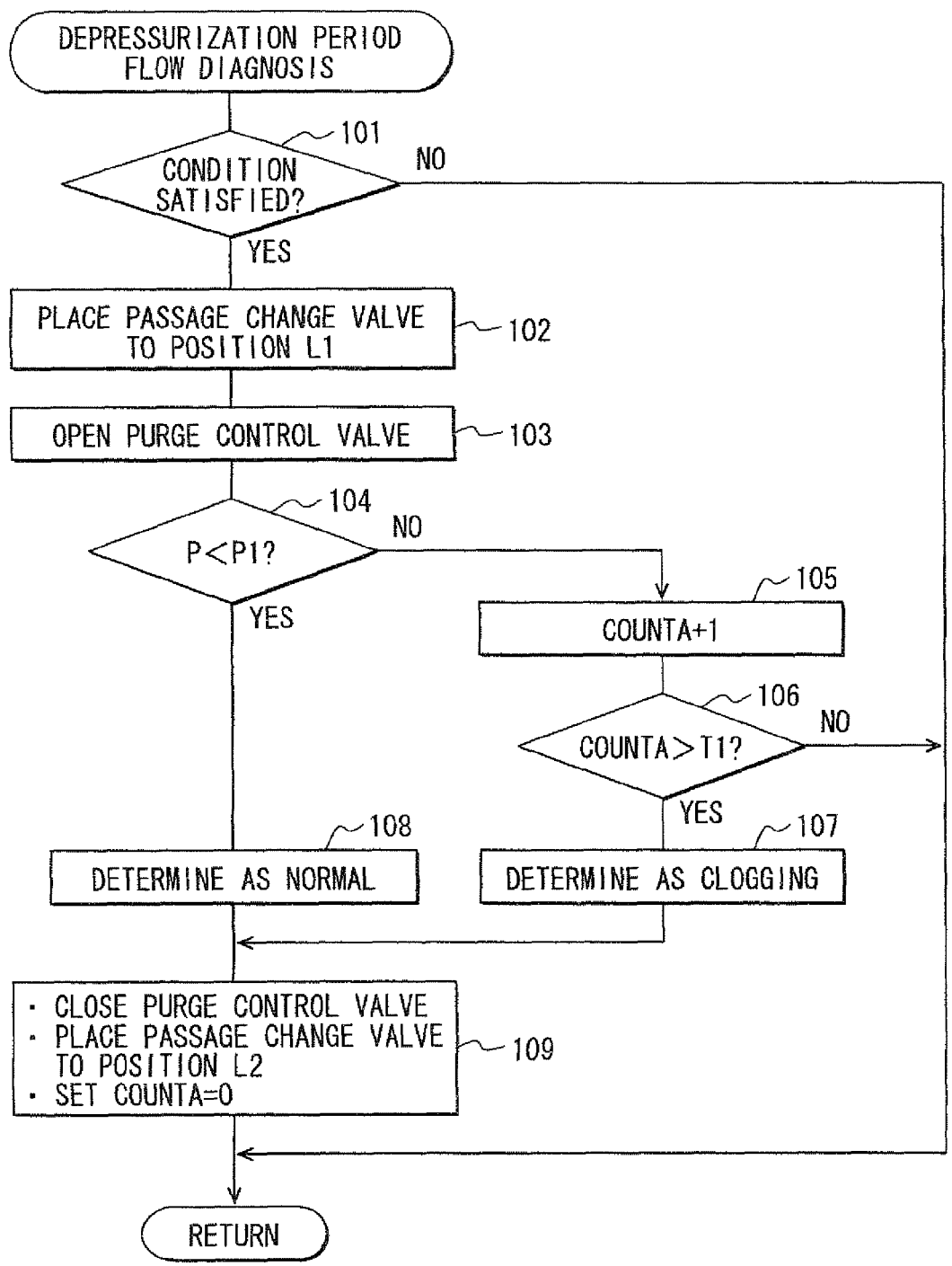
FIG. 8 is a flowchart showing a depressurization period flow diagnosis according to the first embodiment.

The depressurization period flow diagnosis and the post-depressurization period flow diagnosis are respectively carried out according to the flow diagnosis routine shown in FIGS. 8 and 9 and the flow diagnosis routine shown in FIG. 10. The procedure of each of these routines will now be described in detail.

The depressurization period flow diagnosis routine shown in FIG. 8 is executed at predetermined intervals while the power supply to the ECU 31 is turned on. When the present routine starts, it is determined whether an execution condition for executing the depressurization period flow diagnosis is satisfied at step 101. The execution condition may be satisfied, for example, when the engine running state (e.g., the engine rotational speed or the engine load) is stabilized.

When it is determined that the execution condition for executing the depressurization period flow diagnosis is not satisfied at step 101, the present routine is terminated without executing step 102 and the subsequent steps.

When it is determined that the execution condition for executing the depressurization period flow diagnosis is satisfied at step 101, the control proceeds to step 102. First, at step 102, the passage change valve 19 is changed to the negative pressure introducing position L1 to block the communication between the fuel vapor system and the atmosphere. Then, control proceeds to step 103. At step 103, the purge control valve 15 is opened to introduce the negative pressure from the air intake system into the fuel vapor system.

Thereafter, control proceeds to step 104. At step 104, it is determined whether the sensed pressure P of the pressure sensor 26 (the internal pressure of the fuel vapor system sensed with the pressure sensor 26) is reduced and is thereby less than a predetermined value P1. When it is determined that the sensed pressure P of the pressure sensor 26 is equal to or higher than the predetermined value P1, the control proceeds to step 105. At step 105, a count value of a depressurization time counter COUNTA is incremented. Then, the control proceeds to step 106. At step 106, it is determined whether the count value of the depressurization time counter COUNTA is greater than a predetermined value T1. When it is determined that the count value of the depressurization time counter COUNTA is not greater than the predetermined value T1 at step 106, the present routine is terminated without proceeding further.

When it is determined that the sensed pressure P of the pressure sensor 26 is reduced and is thereby less than the predetermined value P1 at step 104 before the count value of the depressurization time counter COUNTA is determined to be greater than the predetermined value T1 at step 106 (see FIG. 3), the control proceeds to step 108. At step 108, it is determined that the purge passage 14, which is the portion of the fuel vapor passage located on the air intake system side of the pressure sensor 26, is not clogged (normal).

In contrast, when it is determined that the count value of the depressurization time counter COUNTA is greater than the predetermined value T1 at step 106 without determining that the sensed pressure P of the pressure sensor 26 is reduced and is thereby less than the predetermined value P1 (see FIG. 4), the control proceeds to step 107. At step 107, it is determined that the purge passage 14, which is the portion of the fuel vapor passage located on the air intake system side of the pressure sensor 26, is clogged (abnormal), so that a countermeasure process for the time of determination of the abnormality is executed. In this countermeasure process, for example, an abnormality flag is set to an ON state, and a warning lamp 36, which is provided to an instrument panel at a driver's seat side in a passenger compartment of the vehicle, is lit. Alternatively, a warning is provided to the driver of the vehicle by indicating a warning display on a warning display device (not shown) of the instrument panel at the driver's seat side, and this abnormality information (e.g., an abnormality code) is stored in a rewritable non-volatile memory (a rewritable memory that holds the stored data even when the power supply to the ECU 31 is turned off).

After making the determination of whether the purge passage 14, which is the portion of the fuel vapor passage located on the air intake system side of the pressure sensor 26, is clogged, the control proceeds to step 109. At step 109, the purge control valve 15 is closed, and the passage change valve 19 is changed to the atmosphere open position L2. Also, the count value of the depressurization time counter COUNTA is reset to zero (0), and then the present routine is terminated.

The post-depressurization period flow diagnosis routine of FIGS. 9 and 10 is executed at predetermined intervals while the power supply to the ECU 31 is turned on. This routine serves as a flow diagnosis means of the present invention. When the present routine starts, it is determined whether an execution condition for executing the post-depressurization period flow diagnosis is satisfied at step 201. The execution condition may be satisfied, for example, when the engine running state (e.g., the engine rotational speed or the engine load) is stabilized, or when the depressurization period flow diagnosis routine determines the normality.

When it is determined that the execution condition for executing the post-depressurization period flow diagnosis is not satisfied at step 201, the present routine is terminated without executing step 202 and the subsequent steps.

When it is determined that the execution condition for executing the post-depressurization period flow diagnosis is satisfied at step 201, the control proceeds to step 202. First, at step 202, it is determined whether a pressure increasing state flag XPUP is zero (0). When it is determined that the pressure increasing state flag XPUP is zero (0) at step 202, the control proceeds to step 203. At step 203, the passage change valve 19 is changed to the negative pressure introducing position L1 to block the communication between the fuel vapor system and the atmosphere. Then, the control proceeds to step 204. At step 204, the purge control valve 15 is opened to introduce the negative pressure from the air intake system to the fuel vapor system.

Thereafter, control proceeds to step 205. At step 205, it is determined whether the sensed pressure P of the pressure sensor 26 (the internal pressure of the fuel vapor system sensed with the pressure sensor 26) is reduced and is thereby less than a predetermined value K1, When it is determined that the sensed pressure P of the pressure sensor 26 is equal to or higher than the predetermined value K1 at step 205, the control proceeds to step 206. At step 206, a count value of a depressurization time counter COUNTB is incremented, and then the present routine is terminated.

Thereafter, when it is determined that the sensed pressure P of the pressure sensor 26 is less than the predetermined value K1 at step 205, it is determined that the introduction of the negative pressure into the fuel vapor system is completed.

Thus, the control proceeds to step 207. At step 207, the purge control valve 15 is closed to terminate the introduction of the negative pressure into the fuel vapor system and to seal the fuel vapor system.

Thereafter, the control proceeds to step 208 of FIG. 10. At step 208, it is determined whether the count value of the depressurization time counter COUNTS is equal to or smaller than a predetermined value T2 to determine whether there is a possibility of clogging of the fuel vapor leading passage 12, which is the other portion of the fuel vapor passage located on the fuel tank side of the pressure sensor 26 (i.e., the possibility of clogging of the fuel vapor leading passage 12 and also a possibility of occurrence of the full level of the fuel in the fuel tank 11 both exist).

When it is determined that the count value of the depressurization time counter COUNTB is larger than the predetermined value T2 (see FIG. 5B), it is determined that there is no possibility of the clogging of the fuel vapor leading passage 12, which is the other portion of the fuel vapor passage located on the fuel tank 11 side of the pressure sensor 26. Thereby, the control proceeds to step 209 without executing the post-depressurization period flow diagnosis. At step 209, it is determined that the fuel vapor leading passage 12, which is the other portion of the fuel vapor passage located on the fuel tank 11 side of the pressure sensor 26, is not clogged (normal).

In contrast, when it is determined that the count value of the depressurization time counter COUNTB is equal to or smaller than the predetermined value T2 (see FIGS. 6B and 7B), it is determined that there is the possibility of clogging of the fuel vapor leading passage 12, which is the other portion of the fuel vapor passage located on the fuel tank side of the pressure sensor 26 (i.e., the possibility of clogging of the fuel vapor leading passage 12 and also the possibility of occurrence of the full level of the fuel in the fuel tank 11 both exist). Thereby, the post-depressurization period flow diagnosis is started as follows.

First, at step 210, a difference ΔP between a current value P(i) of the sensed pressure of the pressure sensor 26 and a previous value P(i−1) of the sensed pressure of the pressure sensor 26 is computed to determine the amount ΔP of pressure increase (a pressure increase rate) since the time of the previous process. Then, the control proceeds to step 211. At step 211, it is determined whether the amount ΔP of pressure increase is smaller than a predetermined value KP to determine whether the sensed pressure P of the pressure sensor 26 is stabilized.

When it is determined that the amount ΔP of pressure increase is equal to or larger than the predetermined value KP at step 211, it is determined that the sensed pressure P of the pressure sensor 26 is still increasing (not yet stabilized). Thus, the control proceeds to step 212. At step 212, the pressure increasing state flag XPUP is set to 1, and the present routine is terminated.

After it is determined that the pressure increasing state flag XPUP is set to 1 at step 212, the control proceeds from step 202 to step 210. Therefore, the difference ΔP between the current value P(i) of the sensed pressure of the pressure sensor 26 and the previous value P(i−1) of the sensed pressure of the pressure sensor 26 is computed to determine the amount ΔP of pressure increase at step 210, and then it is determined whether the amount ΔP of pressure increase is smaller than the predetermined value KP at step 211.

Thereafter, when it is determined that the amount ΔP of pressure increase is smaller than the predetermined value KP at step 211, it is determined that the sensed pressure P of the pressure sensor 26 is stabilized, so that the control proceeds to step 213. At step 213, it is determined whether the sensed pressure P of the pressure sensor 26 is within a predetermined normal range (K2<P<K3).

When it is determined that the sensed pressure P of the pressure sensor 26 is within the predetermined normal range, i.e., K2<P<K3 (see FIG. 6B), the fuel level in the fuel tank 11 should be the full level, so that it is determined that the sensed pressure P of the pressure sensor 26 is stabilized upon increasing to the normal range. Then, control proceeds to step 209. At step 209, it is determined that the fuel vapor leading passage 12, which is the other portion of the fuel vapor passage located on the fuel tank 11 side of the pressure sensor 26, is not clogged (normal).

In contrast, when it is determined that the sensed pressure P of the pressure sensor 26 is out of the predetermined normal range (P≦K2, or K3≦P), the control proceeds to step 214. At step 214, it is determined whether the sensed pressure P of the pressure sensor 26 is equal to or larger than the upper limit value K3 of the normal range. When it is determined that the sensed pressure P of the pressure sensor 26 is smaller than the upper limit value K3 of the normal range (i.e., the sensed pressure P of the pressure sensor 26 being equal to or smaller than the lower limit value K2) at step 214, the control proceeds to step 215. At step 215, it is determined whether the sensed pressure P of the pressure sensor 26 is smaller than an abnormality determination value K4. Here, the abnormality determination value K4 is set to be smaller than the lower limit value K2 of the normal range.

When it is determined that the sensed pressure P of the pressure sensor 26 is smaller than the abnormality determination value K4 (see FIG. 7B), the sensed pressure of the pressure sensor 26 is stabilized without being substantially increased. Therefore, the control proceeds to step 216. At step 216, it is determined that the fuel vapor leading passage 12, which is the other portion of the fuel vapor passage located on the fuel tank 11 side of the pressure sensor 26, is clogged, and the countermeasure process for the time of determination of the abnormality is executed.

In contrast, when it is determined that the sensed pressure P of the pressure sensor 26 is equal to or larger than the abnormality determination value K4 at step 215, the control proceeds to step 218 without determining whether the fuel vapor leading passage 12, which is the other portion of the fuel vapor passage located on the fuel tank 11 side of the pressure sensor 26, is clogged.

Also, when it is determined that the sensed pressure P of the pressure sensor 26 is equal to or larger than the upper limit value K3 of the normal range at step 214, the control proceeds to step 217. At step 217, it is determined that there is the leak in the fuel vapor system, and the countermeasure process for the time of determination of the abnormality is executed.

After making the determination of whether the fuel vapor leading passage 12, which is the other portion of the fuel vapor passage located on the fuel tank 11 side of the pressure sensor 26, is clogged, the control proceeds to step 218. At step 218, the passage change valve 19 is changed to the atmosphere open position L2, and the count value of the depressurization time counter COUNTB is reset to zero (0). Then, the present routine is terminated.

According to the first embodiment, the post-depressurization period flow diagnosis is executed to determine whether the fuel vapor leading passage 12, which is the other portion of the fuel vapor passage located on the fuel tank 11 side of the pressure sensor 26, is clogged based on the sensed pressure behavior after the negative pressure introduction (based on the behavior of the pressure in the fuel vapor system sensed with the pressure sensor 26 in the sealed state of the fuel vapor system, which is sealed after the introduction of the negative pressure into the fuel vapor system) in view of the fact that the sensed pressure behavior after the introduction of the negative pressure differs between the case where fuel level in the fuel tank 11 is the full level and the case where the fuel vapor leading passage 12, which is the other portion of the fuel vapor passage located on the fuel tank 11 side of the pressure sensor 26, is clogged. Therefore, it is possible to accurately distinguish between the case where fuel level in the fuel tank 11 is the full level and the case where the fuel vapor leading passage 12 is clogged.

Furthermore, according to the present embodiment, it is determined whether there is the possibility of clogging of the fuel vapor leading passage 12, which is the other portion of the fuel vapor passage located on the fuel tank side of the pressure sensor 26 (i.e., the possibility of clogging of the fuel vapor leading passage 12 and also the possibility of occurrence of the full level of the fuel in the fuel tank 11 both exist) based on the negative pressure introducing time (the count value of the depressurization time counter COUNTB), which is the time taken until the sensed pressure P of the pressure sensor 26 is reduced equal to or smaller than the predetermined value K1. Then, only when it is determined that there is the possibility of clogging of the fuel vapor leading passage 12, the post-depressurization period flow diagnosis is executed. Therefore, it is possible to avoid the execution of the post-depressurization period flow diagnosis in advance in the case where there is no possibility of clogging of the fuel vapor leading passage 12.

Second Embodiment

A second embodiment of the present invention will be described with reference to FIGS. 11 to 13. In the following description, components as well as steps similar to those of the first embodiment will not be described for the sake of the simplicity, and differences, which are different from those of the first embodiment, will be mainly discussed.

Figure 11:
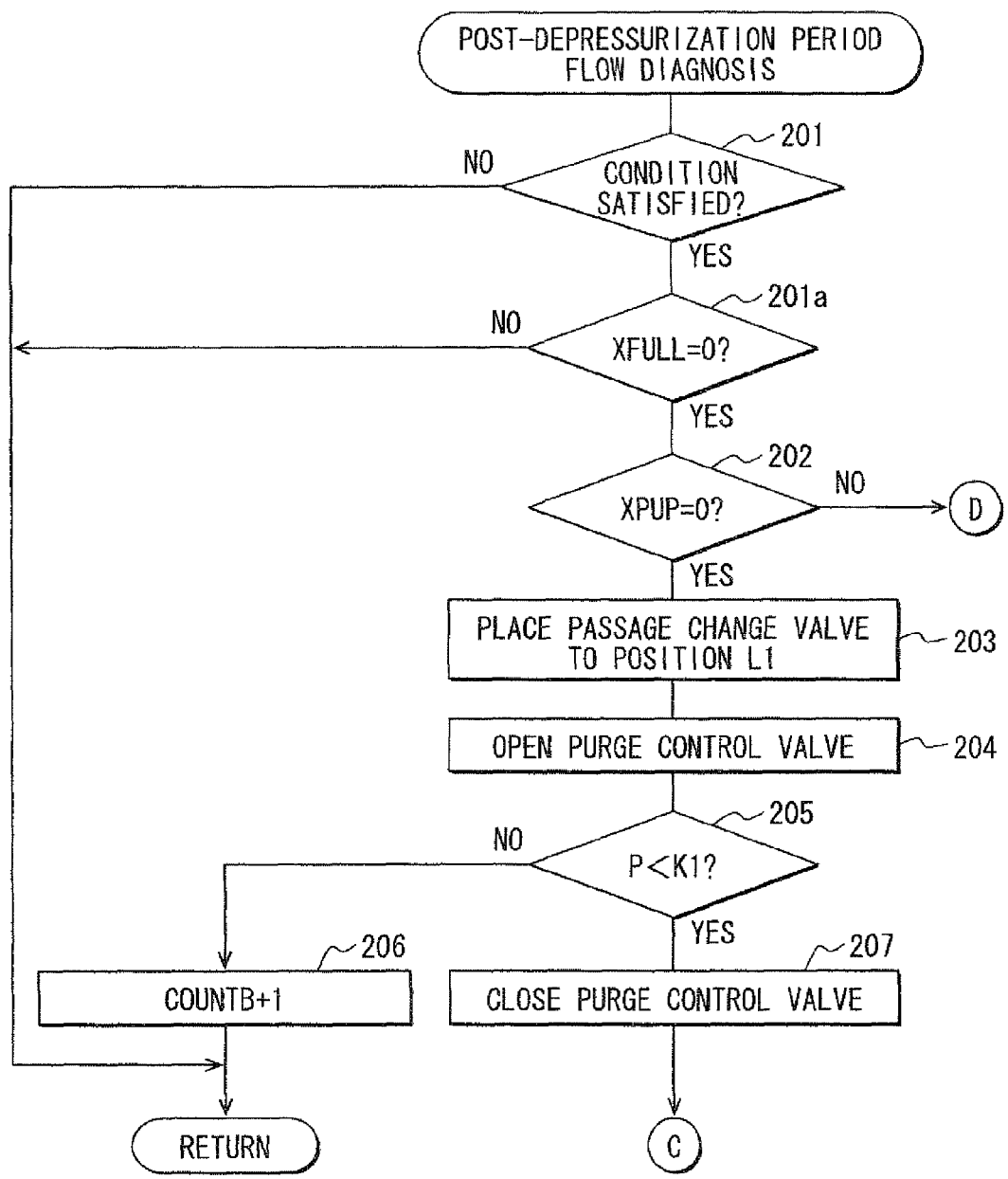
FIG. 11 is a flowchart showing a first part of a post-depressurization period flow diagnosis according to a second first embodiment of the present invention.
Figure 12:
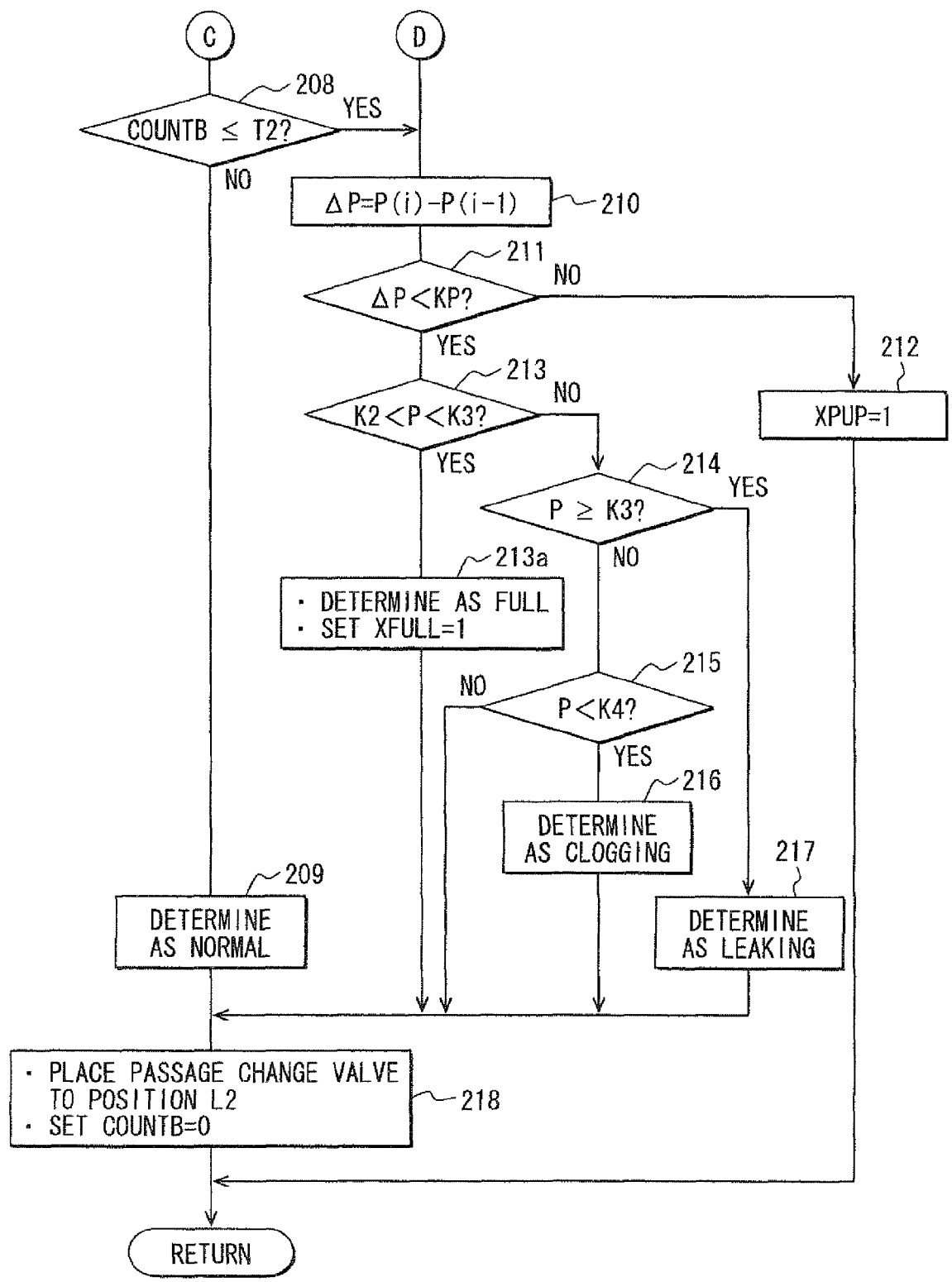
FIG. 12 is a flowchart showing a second part of the post-depressurization period flow diagnosis according to the second embodiment.
Figure 13:
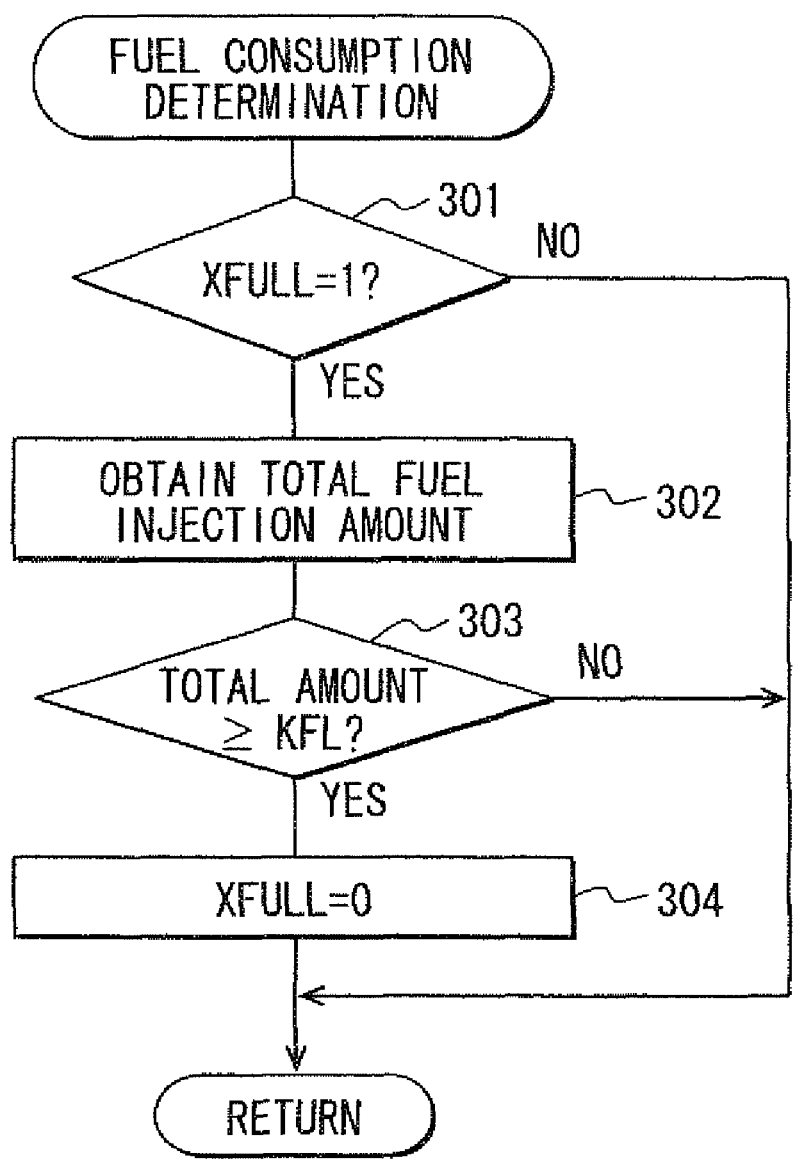
FIG. 13 is a flowchart showing a fuel consumption determining routine according to the second embodiment.

In the second embodiment, the ECU 31 executes the respective routines shown in FIGS. 11 to 13 to determine whether the fuel level in the fuel tank 11 is the full level based on the sensed pressure behavior after the negative pressure introduction (the behavior of the internal pressure of the fuel vapor system, which is sensed with the pressure sensor 26 in the sealed state of the fuel vapor system after the introduction of the negative pressure into the fuel vapor system). Thereafter, when it is determined that the fuel level in the fuel tank 11 is the full level, the execution of the post-depressurization period flow diagnosis is prohibited. Then, it is determined whether the amount of consumed fuel, which is drawn out of the fuel tank 11 and is consumed, is equal to or larger than a predetermined amount. When it is determined that the amount of consumed fuel, which is drawn out of the fuel tank 11 and is consumed, is equal to or larger than the predetermined amount, the post-depressurization period flow diagnosis is permitted.

The routine shown in FIGS. 11 and 12 is similar to the routine shown in FIGS. 9 and 10 except that step 201a and step 213a are added. Other than this point, the routine shown in FIGS. 11 and 12 is the same as the routine shown in FIGS. 9 and 10.

In the post-depressurization period flow diagnosis routine shown in FIGS. 11 and 12, when it is determined that the execution condition for executing the post-depressurization period flow diagnosis routine is satisfied at step 201, the control proceeds to step 201a. At step 201a, it is determined whether a fuel tank full level state flag XFULL is set to zero (0), which indicates that the fuel level in the fuel tank 11 is not the full level. When it is determined that the fuel tank full level state flag XFULL is set to zero (0), step 202 and the subsequent steps of the post-depressurization period flow diagnosis are executed.

First, the passage change valve 19 is changed to the negative pressure introducing position L1, and the purge control valve 15 is opened to introduce the negative pressure from the air intake system into the fuel vapor system (steps 202 to 206). Thereafter, the purge control valve 15 is closed to seal the fuel vapor system (steps 207).

Thereafter, when it is determined that the count value of the depressurization time counter COUNTB is equal to or smaller than the predetermined value T2 at step 208 of FIG. 12, it is determined that there is the possibility of clogging of the fuel vapor leading passage 12, which is the other portion of the fuel vapor passage located on the fuel tank side of the pressure sensor 26. Thus, the post-depressurization period flow diagnosis is started as follows.

First, the amount ΔP of pressure increase in the sensed pressure of the pressure sensor 26 is obtained at step 210. Then, when it is determined that the amount ΔP of pressure increase is smaller than the predetermined value KP at step 211, it is determined that the sensed pressure P of the pressure sensor 26 is stabilized. Thereafter, at step 213, it is determined whether the sensed pressure P of the pressure sensor 26 is within the predetermined normal range (K2<P<K3).

When it is determined that the sensed pressure P of the pressure sensor 26 is within the predetermined normal range (K2<P<K3), the fuel level in the fuel tank 11 is the full level, so that it is determined that the sensed pressure P of the pressure sensor 26 is stabilized upon increasing to the normal range. Thus, the post-depressurization period flow diagnosis is terminated. Then, the control proceeds to step 213a. At step 213a, it is determined that the fuel level in the fuel tank 11 is the full level, so that the fuel tank full level state flag XFULL is set to 1, which indicates that the fuel level in the fuel tank 11 is the full level. The process of step 213 and step 213a correspond to a full level determining means of the present invention.

After the fuel tank full level state flag XFULL is set to 1 at step 213a, NO is returned at step 201a. Thereby the present routine is terminated without executing step 202 and the subsequent steps of the post-depressurization period flow diagnosis. In this way, the execution of the post-depressurization period flow diagnosis is prohibited. This process corresponds to a diagnosis prohibiting means.

Then, in a fuel consumption determining routine shown in FIG. 13, when it is determined that the amount of Consumed fuel, which is drawn out of the fuel tank 11 and is consumed, is equal to or larger than a predetermined amount KFL, the fuel tank full level state flag XFULL is reset to zero (0). Then, YES is returned at step 201a. Thus, step 202 and the subsequent steps of the post-depressurization period flow diagnosis are executed. That is, the post-depressurization period flow diagnosis is permitted. This process corresponds to a diagnosis permitting means of the present invention.

The fuel consumption determining routine shown in FIG. 13 is executed at predetermined intervals (e.g., the fuel injection periods) and corresponds to a fuel consumption determining means of the present invention. When this routine starts, it is determined whether the fuel tank full level state flag XFULL is set to 1 (full level) at step 301. When it is determined that the fuel tank full level state flag XFULL is zero (0), the present routine is terminated without executing the process at step 302 and the subsequent steps.

When it is determined that the fuel tank full level state flag XFULL is set to 1, the control proceeds to step 302. At step 302, the current total fuel injection amount is computed by adding the current fuel injection amount (i.e., the amount of fuel injected from the fuel injectors into combustion chambers of cylinders of the engine during the present interval) to the previous total fuel injection amount (the cumulative fuel injection amount before the present interval). The current total fuel injection amount should be considered as the total fuel injection amount after it is determined that the fuel level in the fuel tank 11 is the full level. Thereafter, control proceeds to step 303. At step 303, it is determined whether the amount of consumed fuel, which is drawn out of the fuel tank 11 and is consumed, is equal to or larger than the predetermined amount KFL by determining whether the total fuel injection amount is equal to or larger than the predetermined amount KFL. In this instance, the predetermined amount KFL is set as, for example, the amount of fuel, which is required to be drawn out of the fuel tank 11 and consumed in order to open the fuel vapor inlet of the first passage 12a of the fuel vapor leading passage 12.

When it is determined that the total fuel injection amount is equal to or larger than the predetermined amount KFL at step 303, it is determined that the fuel level in the fuel tank 11 is no longer the full level. Thus, the control proceeds to step 304. At step 304, the fuel tank full level state flag XFULL is reset to zero (0).

In the second embodiment described above, it is determined whether the fuel level in the fuel tank 11 is the full level based on the sensed pressure behavior after the negative pressure introduction. Then, when it is determined that the fuel level in the fuel tank 11 is the full level, the execution of the post-depressurization period flow diagnosis is prohibited. Therefore, in the state of the full level of the fuel tank 11, it is possible to avoid erroneously determining that the fuel vapor leading passage 12, which is the other portion of the fuel vapor passage located on the fuel tank 11 side of the pressure sensor 26, is not clogged (normal).

Furthermore, according to the second embodiment, it is determined whether the amount of consumed fuel, which is drawn out of the fuel tank 11 and is consumed, is equal to or larger than the predetermined amount after determining that the fuel level in the fuel tank 11 is the full level. Then, when it is determined that the amount of consumed fuel, which is drawn out of the fuel tank 11 and is consumed, is equal to or larger than the predetermined amount, the execution of the post-depressurization period flow diagnosis is permitted. Therefore, it is possible to determine whether the fuel vapor leading passage 12, which is the other portion of the fuel vapor passage located on the fuel tank 11 side of the pressure sensor 26, is clogged, by executing the post-depressurization period flow diagnosis upon occurrence of the consumption of the fuel in the fuel tank 11 for the amount equal to or larger than the predetermined amount for reducing the fuel level in the fuel tank 11 from the full level.

In the first and second embodiments, the process of introducing the negative pressure into the fuel vapor system for the purpose of executing the depressurization period flow diagnosis is performed separately from the process of introducing the negative pressure into the fuel vapor system for the purpose of executing the post-depressurization period flow diagnosis. Alternatively, the post-depressurization period flow diagnosis may be subsequently and continuously executed after the execution of the depressurization period flow diagnosis.

Furthermore, in the first and second embodiments, the depressurization period flow diagnosis and the post-depressurization period flow diagnosis are both executed. Alternatively, it is possible to execute only the post-depressurization period flow diagnosis.

Also, in the first and second embodiments, at the time of executing the post-depressurization period flow diagnosis, the negative pressure is introduced from the air intake system into the fuel vapor system. Alternatively, the negative pressure may be introduced from the vacuum pump 23 of the leak check module 17 into the fuel vapor system.

In addition, the present invention is not limited to the fuel vapor purge system, which includes the leak check module 17 shown in FIG. 2. That is, the present invention may be applied to various types of the fuel vapor purge systems.

Additional advantages and modifications will readily occur to those skilled in the art. The invention in its broader terms is therefore not limited to the specific details, representative apparatus, and illustrative examples shown and described.

What is claimed is:

1. A flow diagnosis apparatus for a fuel vapor purge system, which includes a fuel vapor system that has a fuel tank and a fuel vapor passage and purges fuel vapor generated in the fuel tank into an air intake system of an internal combustion engine through the fuel vapor passage, the flow diagnosis apparatus comprising:
a pressure sensing unit configured to sense a pressure of the fuel vapor system at the fuel vapor passage; and
a flow diagnosis unit configured to execute a post-depressurization period flow diagnosis to determine whether the fuel vapor passage is clogged based on an analysis of the pressure in the fuel vapor system, which is sensed with the pressure sensing unit while the fuel vapor system is in a sealed state after introduction of a negative pressure into the fuel vapor system.

2. The flow diagnosis apparatus according to claim 1, wherein:
the flow diagnosis unit determines whether a possibility of the clogging of the fuel vapor passage exists based on the analysis of the pressure in the fuel vapor system, which is sensed by the pressure sensing unit at the time of introducing the negative pressure into the fuel vapor system before the execution of the post-depressurization period flow diagnosis; and
when the flow diagnosis unit determines that the possibility of the clogging of the fuel vapor passage exists, the flow diagnosis unit executes the post-depressurization period flow diagnosis.

3. The flow diagnosis apparatus according to claim 1, further comprising:
a pump that introduces a predetermined pressure into the fuel vapor system upon operation of the pump;
a reference pressure sensing arrangement that includes a reference orifice, which has a predetermined diameter;
a passage change valve that is operable to change between a passage, which introduce a predetermined pressure from the pump into the reference pressure sensing arrangement upon operation of the pump, and a passage, which introduces a predetermined pressure from the pump into the fuel vapor system upon operation of the pump, wherein the pressure sensing unit, the pump, the reference pressure sensing arrangement and the passage change valve form a pressure introduction sensing device; and
a leak diagnosis unit configured to diagnose whether a leak exists in the fuel vapor system, wherein the leak diagnosis unit executes a reference pressure sensing process to sense a reference pressure by changing the passage change valve to introduce the predetermined pressure into the reference pressure sensing arrangement and sensing the reference pressure, which is limited by the reference orifice and also executes a fuel vapor system internal pressure sensing process to sense the pressure in the fuel vapor system by introducing the predetermined pressure into the fuel vapor system, and the leak diagnosis unit determines whether the leak exists in the fuel vapor system by comparing the reference pressure and the pressure in the fuel vapor system.

4. The flow diagnosis apparatus according to claim 1, wherein:
   the pressure sensing unit senses the pressure of the fuel vapor system at a predetermined sensing location of the fuel vapor passage, which is located between the fuel tank and the air intake system; and
   the flow diagnosis unit determines whether the fuel vapor passage is clogged in an area between the predetermined sensing location and the fuel tank based on the analysis of the pressure in the fuel vapor system, which is sensed with the pressure sensing unit at the predetermined sensing location of the fuel vapor passage while the fuel vapor system is in the sealed state.

5. The flow diagnosis apparatus according to claim 1, further comprising:
   a full level unit configured to determine whether a fuel level in the fuel tank is a full level based on the analysis of the pressure in the fuel vapor system, which is sensed with the pressure sensing unit in a state where the fuel vapor system is sealed upon closing of a purge control valve after the introduction of the negative pressure into the fuel vapor system; and
   a diagnosis prohibiting unit configured to prohibit the execution of the post-depressurization period flow diagnosis when the full level determining unit determines that the fuel level in the fuel tank is the full level.

6. The flow diagnosis apparatus according to claim 5, further comprising:
   a fuel consumption determining unit configured to determine whether an amount of consumed fuel, which is drawn out of the fuel tank and is consumed, is equal to or larger than a predetermined amount after the full level determining unit determines that the fuel level in the fuel tank is the full level; and
   a diagnosis permitting unit configured to permit the execution of the post-depressurization period flow diagnosis when the fuel consumption determining unit determines that the amount of consumed fuel, which is drawn out of the fuel tank and is consumed, is equal to or larger than the predetermined amount.

* * * * *